United States Patent
Ueda

(10) Patent No.: US 7,903,005 B2
(45) Date of Patent: Mar. 8, 2011

(54) METHOD OF TRANSFORMING GEOGRAPHIC COORDINATE

(76) Inventor: Naoki Ueda, Nara (JP)

( * ) Notice: Subject to any disclaimer, the term of this patent is extended or adjusted under 35 U.S.C. 154(b) by 618 days.

(21) Appl. No.: 12/010,924

(22) Filed: Jan. 31, 2008

(65) Prior Publication Data

US 2010/0289675 A1    Nov. 18, 2010

Related U.S. Application Data

(63) Continuation of application No. PCT/JP2006/314842, filed on Jul. 27, 2006.

(30) Foreign Application Priority Data

Aug. 2, 2005    (JP) ................. 2005-223816

(51) Int. Cl.
*H03M 7/12* (2006.01)

(52) U.S. Cl. .................. 341/83; 701/200

(58) Field of Classification Search .......... 341/83; 701/200

See application file for complete search history.

(56) References Cited

U.S. PATENT DOCUMENTS

| | | | |
|---|---|---|---|
| 6,005,504 A | 12/1999 | Hirono | |
| 6,552,670 B2 | 4/2003 | Sundaravel et al. | |
| 7,302,343 B2* | 11/2007 | Beatty | 701/214 |
| 2006/0177105 A1* | 8/2006 | Bowling | 382/113 |
| 2008/0046169 A1* | 2/2008 | Beatty | 701/200 |

FOREIGN PATENT DOCUMENTS

| | | | |
|---|---|---|---|
| JP | 63-197986 A | | 8/1988 |
| JP | 10-207352 A | | 8/1998 |
| JP | 10207352 A | * | 8/1998 |
| JP | 11184374 A | * | 7/1999 |
| JP | 2000-181345 A | | 6/2000 |
| JP | 2000181345 A | * | 6/2000 |
| JP | 2001-005834 A | | 1/2001 |
| JP | 2001005834 A | * | 1/2001 |
| JP | 2004-004955 A | | 1/2004 |
| JP | 2004004955 A | * | 1/2004 |
| JP | 3584459 B | | 8/2004 |

OTHER PUBLICATIONS

Keizo Sugiyama et al., Technical Report of IEICE, vol. 93 No. 486, p. 7-14 Feb. 1994.

* cited by examiner

*Primary Examiner* — Howard Williams
(74) *Attorney, Agent, or Firm* — Kubotera & Associates LLC

(57) ABSTRACT

A method of transforming a geographic coordinate to a geographic location code includes the steps of: retrieving a latitude value and a longitude value of the geographic coordinate; quantizing the latitude value to a first integer value; quantizing the longitude value to a second integer value; converting the first integer value to a first code string, said first code string including a first digit representing a non-numeric character, a second digit representing a non-numeric character, and a third digit representing a numeric character; converting the second integer value to a second code string, said second code string including a fourth digit representing a non-numeric character, a fifth digit representing a non-numeric character, and a sixth digit representing a numeric character; and combining the first code string and the second code string to obtain the geographic location code having a fixed pattern of radix in a mixed radix notation system representation.

8 Claims, 16 Drawing Sheets

The format of LocaPoint code

Format "A": 26th notation using from "A" to "Z" for value from 0 to 25
Format "N": popular decimal notation using from "0" to "9"

Example of transforming of present invention.
Value among latitude, longitude, intermediate value, and final Locapoint code The format of LocaPoint code Format "A": 26th notation using from "A" to "Z" for value from 0 to 25
Format "N": popular decimal notation using from "0" to "9"

position of digit where 3n+2, and 3n+0. (in 26th notation system)

| Value | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Represents Characte | A | B | C | D | E | F | G | H | I | J | K | L | M | N | O | P | Q | R | S | T | U | V | W | X | Y | Z | position of digit where 3n+1. (in Decimal notation system)

| Value | 0 | 1 | 2 | 3 | 4 | 5 | 6 | 7 | 8 | 9 |
|---|---|---|---|---|---|---|---|---|---|---|
| Represents Characte | 0 | 1 | 2 | 3 | 4 | 5 | 6 | 7 | 8 | 9 |

Fig. 5

| Decimal | Mixed Radix | note |
|---:|---:|---|
| (45697600) | 1AA0AA0 | |
| 45697599 | ZZ9ZZ9 | Max value with 6 digits |
| 45697598 | ZZ9ZZ8 | |
| ⋮ | ⋮ | |
| 22848800 | NA0AA0 | Mid value with 6 digits |
| ⋮ | ⋮ | |
| 1757601 | BA0AA1 | |
| 1757600 | BA0AA0 | |
| 1757599 | AZ9ZZ9 | |
| ⋮ | ⋮ | |
| 67601 | AB0AA1 | |
| 67600 | AB0AA0 | |
| 67599 | AA9ZZ9 | |
| ⋮ | ⋮ | |
| 6761 | AA1AA1 | |
| 6760 | AA1AA0 | |
| 6759 | AA0ZZ9 | |
| ⋮ | ⋮ | |
| 261 | AA0BA1 | |
| 260 | AA0BA0 | |
| 259 | AA0AZ9 | |
| ⋮ | ⋮ | |
| 11 | AA0AB1 | |
| 10 | AA0AB0 | |
| 9 | AA0AA9 | |
| ⋮ | ⋮ | |
| 1 | AA0AA1 | |
| 0 | AA0AA0 | Min value with 6 digits |

Fig. 6

Conventional telephone directory

| Name | Address | Telephone number |
|---|---|---|
| ABC Corporatic | 5 Sendagaya, Tokyo | 1234−5678 |
| ABC Inc. | 2 Shinjuku, Tokyo | 1234−1234 |
| ABC Restauran | 1 Marunouchi, Tokyo | 3456−7890 |
| : | : | : |

Telephone directory which has location information by Locapoint code

| Name | Address | Telephone number | Place |
|---|---|---|---|
| ABC Corporatic | 5 Sendagaya, Tokyo | 1234−5678 | SE0. XC3. GW0. HU0 |
| ABC Inc. | 2 Shinjuku, Tokyo | 1234−1234 | SE0. XC3. JC0. C05 |
| ABC Restauran | 1 Marunouchi, Tokyo | 3456−7890 | SE0. XC4. AL5. NL7 |
| : | : | : | : |

Fig. 9

Example of using Locapoint code printed on paper media

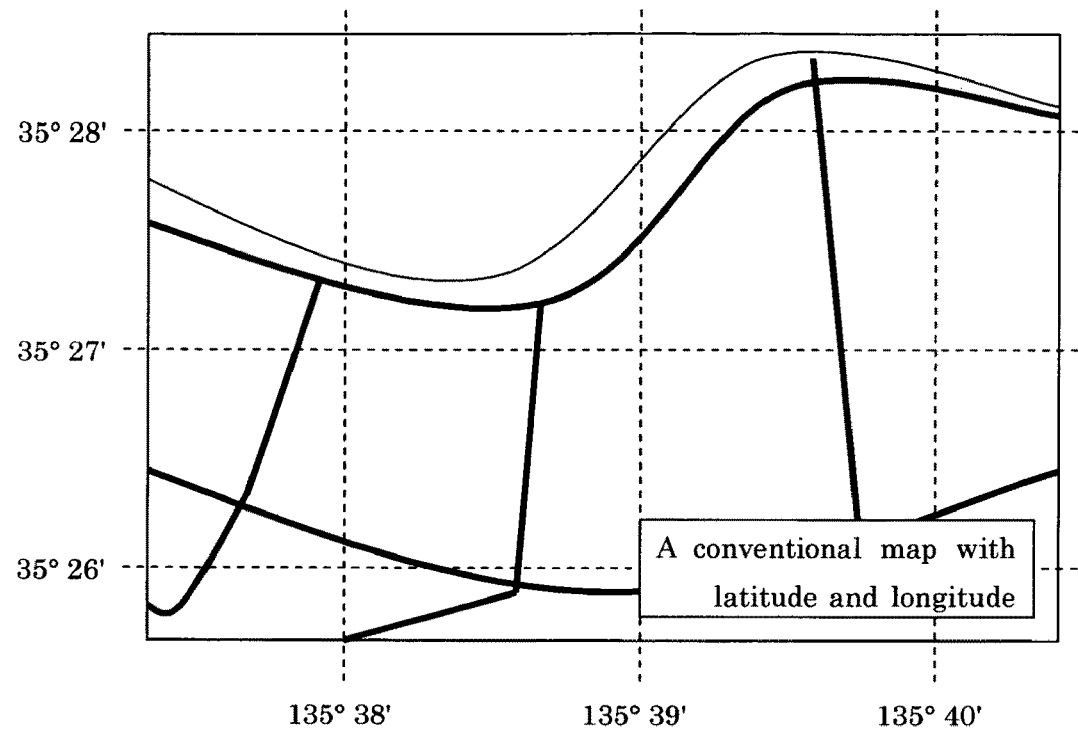
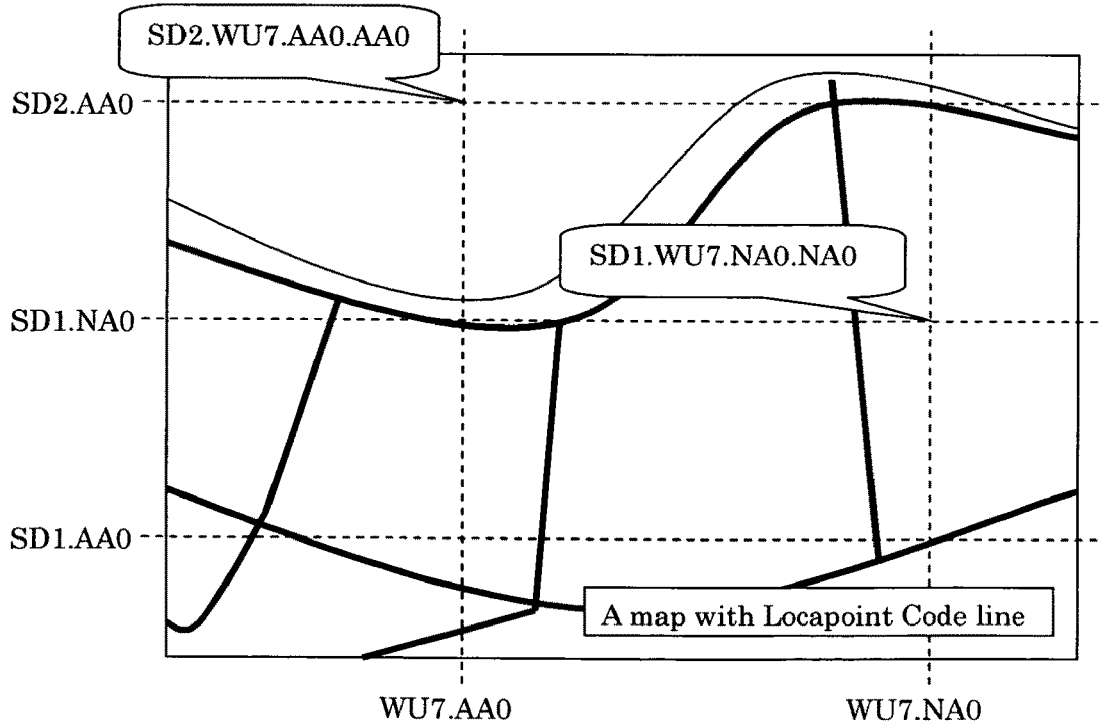
Fig. 11

METHOD OF TRANSFORMING GEOGRAPHIC COORDINATE

CROSS-REFERENCE TO RELATED APPLICATION

This is a continuation application of the prior PCT application, No. PCT/JP2006/314842, filed on Jul. 27, 2006, pending. The disclosure of Japanese Patent Application JP2005-223816, filed on Aug. 2, 2005, is incorporated in the application by reference.

BACKGROUND OF THE INVENTION

Field of the Invention

The present invention relates to expressing, identifying, encoding, or decoding geographic coordinates.

When locating, identifying or expressing any location in navigation system or Geographic Information System, latitude and longitude are widely used method. Geographic coordinates by latitude and longitude are popular and versatile. However, two values must be handled together, and long digits of number must be handled. Thus, latitude and longitude may cause human error.

To decrease human error in handling geographic coordinates, or increase a convenience or user-friendliness, various coding system are developed. Inputting the 'code' will point geographic location instantly. All related patents above are geographic location coding system or method.

Some of them use a string 'code' that is directly encoded or processed from latitude and longitude, without using external data such as database. In this way, code length can be shorter than numeric data. For example reference patent No. 1 and No. 2 are using 37 kinds of character, 'from 0 to 9, from A to Z, and =(equal)', to express a value of $37^{th}$ notation. It only needs 9 characters to point out any geographic coordinates on earth with precision of 0.0003 degree. Similarly, reference No. 3 are using 64 kinds of Japanese Hiragana characters, so use only 8 characters to point out a location with enough precision.

Encoding code using more than 10 characters and keeping precision means in a basic sense that shorten the length of digit using notation of base of more than 10 (decimal). For example, 50 bit of information amount or 640,000,000,000,000 patterns are needed to express any location on earth with 0.00001 degree precision. For this information amount, decimal notation needs 15 digits. Binary notation needs 50 digits (bits). However, $36^{th}$ notation needs 10 digits, and $60^{th}$ digits need 9 digits. That means that string by 9 or 10 characters can be a code for geographic coordinates.

Reference No. 4, 5, 6, 7, and 8 are similar related arts those are trying to make latitude and longitude easier to use.

These 'short' codes is useful especially when human have to handle geographic coordinate data directly, such as inputting to location code from magazines, news papers, ads, or over a phone to the navigation system. Geographic location code is an interface, so code must be easy and less mistakable. Previously developed 'code' in related art are all trying to make it less mistakable by shorten its length in various ways comparing to the length of expression in latitude and longitude.

REFERENCES

No. 1: JP 10-207352A
No. 2: U.S. Pat. No. 6,005,504 A
No. 3: JP 2001-005834 A
No. 4: JP 3584459 B
No. 5: JP 63-197986 A
No. 6: JP 2004-4955 A
No. 7: U.S. Pat. No. 6,552,670 B2
No. 8: JP 2000-181345 A

However, encoded code is usually looks like random string for human, such as "LM8GGKTTR" showed in reference No. 1. Random string are may cause human error, such as cognition error, hearsay error, listening error, input error, or memory error, so it is why random string is often used as a password string.

A geographic location code that has better recognition for human and method to encode and decode said code needs to be provided.

SUMMARY OF THE INVENTION

In this document following operator code is used as defined below:
'^' represents factorial operator
'*' represents multiplication operator
'/' represents division operator
'%' represents remainder operator
'int(A)' represents function to round off value A and make it integer.

According to a first aspect of the present invention, a method of transforming a geographic coordinate into a formatted string, comprises the steps of:
accepting latitude and longitude value;
converting said values into integer value;
converting said integer value into formatted string; and
outputting said formatted string,
wherein said formatted string is consisting essentially of digits in where only numeric character is used, and digits in where only non-numeric character is used; and said two types of digit are arranged in a fixed pattern.

Following are detailed explanation of each step.

Accepting step will accept an input from keyboard, output of other computer program, or device that can output latitude and longitude by pointing a location on screen such as navigation system or Geographic Information System, (GIS).

Latitude and longitude values provided will be calculated to one integer value, according to specific encoding rule.

Then, a step of convert said integer value into formatted string, convert integer value to string in that positions of numeric character and positions of no-numeric character are fixed in a format. In this step, To display random data on format in which a same group of characters is used in all positions, data are also random and monotony. On the other hand, to display random data on format that positions of numeric character and positions of no-numeric character are fixed, the pattern of group, numeric or non-numeric will have a fixed pattern, although value could be random.

Because human recognize numeric characters and non-numeric characters as different groups, format always have a pattern of group. Thus, it decreases randomness that become obstacle in cognition, and increases an ability to be recognized.

In addition, because positions for numeric and non-numeric character is fixed, visually similar letters, such as number zero (0) and alphabet O, or number one (1) and alphabet capital I or small l or 'l' mark, miss recognition can not be occurred in theory. This also decreases human cognition error.

Furthermore, because position of numeric character and non-numeric character are fixed, when human input a specific code by keyboard, double pressing a key or miss pressing a key cause positions of pattern will shift, and number comes on non-numeric positions, or non-numeric character comes on numeric position. That increases a possibility of error detection.

In a Step outputting said formatted string, said formatted string will be output as a specific code that represents geographic location to computer display, map display device, navigation device, or another computer program.

According to a second aspect of the present invention, said digits in where only numeric character is used in formatted string, is using one of M kinds of numeric letter to express value from 0 to M−1 in notation of base of M,
said digits in where only non-numeric character is used in formatted string, is using one of N kinds of non-numeric letter to express value from 0 to N−1 in notation of base of N, and
said two types of digit are a digit of notation of base of M and a digit of notation of base of N, and digits of notation of base of M and digits of notation of base of N are arranged in a fixed pattern to consist mixed radix notation expression for one integer value,
wherein M is a natural number; N is a natural number;

Mixed radix notation system is a numeric representation system in that radix base is different by digit position. For familiar example is a time, and each digit or unit have different base of radix such as millisecond (radix base is 1000), second (radix base of 60), minutes (radix base of 60), hour (radix base of 24), day (radix base of 7), and week, month, year. Another example is angle (degree, minutes, second), Inch-yardage unit system in USA, and currency unit such as dollar and cents.

An example of said digits in where only non-numeric character is used in formatted string, is using one of N kinds of non-numeric letter to express value from 0 to N−1 in notation of base of N, and said two types of digit are a digit of notation of base of M and a digit of notation of base of N, is notation radix base of 26 (or $26^{th}$ notation) to use alphabet capital from A to Z in alphabetical order to represents values from 0 to 25. With this condition, whether character is number or non-numeric determines which radix base is used in its position uniquely.

Note that, Hexadecimal notation that used 0 to 9 and A to F is not a sufficient notation base of N, since number or both non-numeric character will appear. However, Hexadecimal notation, or $16^{th}$ notation using from A to P to represents from 0 to 15, it is sufficient condition for notation of N.

Note that, in case of N=M, radix base is same. In mathematics points of view, this is not a mixed radix notation system. However, benefit still works even in this case, because difference between numeric position and non-numeric position is clear.

By using mixed radix notation system, integer value can be converted into string without using neither database nor complicated algorithm.

According to a third aspect of the present invention, said digits in where only numeric character is used in formatted string, is in decimal notation that uses from 0 to 9 to express value of from 0 to 9, said digits in where only non-numeric character is used in formatted string, is in 26th notation that uses from A to Z in alphabetical order to express value of from 0 to 25,
digits of 3n+1 of said fixed pattern is in decimal notation, digits of 3n+0 and 3n+2 are in 26th notation,
said fixed pattern is a periodic pattern of notation of base in each 3 letters, and
said formatted string can express value from 0 to $6760^4$ with 12 digits,
wherein n is a natural number By using the mixed radix notation, only English alphabet capital A to Z or small a to z are required. Thus, code can be expressed without local fonts or characters such as Chinese character or Japanese Hiragana characters. In addition, to use only capital letters or only small letters can avoid cognitive error in aural transformation.

In addition, non-numeric character continues at maximum two letters. Cognitive error can be miss-order of letters or hear/read wrong. Limiting at maximum two letters, minimize miss-order error possibility.

In mix radix notation explained above uses two digits in $26^{th}$ notation and one digit in decimal, total three letters can express 26*26*10=6760 kinds of values. This three letters pattern repeats four times, so total 12 letters can express $6760^4$ kinds of values.

According to a fourth aspect of the present invention, said step converting latitude and longitude values into integer value is that;
quantizing each latitude value and longitude value to a integer range from 0 to $L^2-1$;
calculating quotient by L as an upper digits information and reminder by L as a lower digits information of said each integer values;
arranging each quotient values contiguously and reminder values contiguously in different 4 digits of notation of base of L;
wherein the value of notation of base of L is said quantized integer value, and L is a natural number.

According to the fourth aspect, each latitude and longitude are converted to integer value that could have a value from 0 to $L^2-1$ at maximum, then make quotient by L to upper digits information, make reminder by L to lower digits information. It is equipollence to calculating first digit, second digit in radix base of L.

Both upper digits information and lower digits information has equal information amount of log 2(L) bit. Upper digits information for latitude and longitude can be used as a representation of band area that has width of minimum digit multiplied by L. Using both latitude and longitude upper digits information can represent wide area information. Similarly, both lower digits information can be uses as a precise coordinates within wide area.

According to the fourth aspect, both upper digits information become upper digits of formatted string code, thus left half of the code can be used as area code of telephone number or ZIP code. Because area code can not be changed often in case of local usage, the more area code is used the more people remember area code. As a matter of fact, only lower digits part is an objective to cognition or memorize, and that decrease a burden for human recognition. This increase an ability to be recognized.

According to a fifth aspect of the present invention, said step converting latitude and longitude values into integer value is that;
quantizing each latitude value and longitude value to a integer range from 0 to $6760^2-1$;
calculating quotient and reminder by 6760 of said each integer values;
arranging quotient values of latitude element in $4^{th}$ digit is $6760^{th}$ notation;
arranging quotient values of longitude element in 3rd digit is $6760^{th}$ notation;
arranging quotient values of latitude element in 2nd digit is $6760^{th}$ notation; and arranging quotient values of longitude element in 1st digit is $6760^{th}$ notation;
wherein the value of notation of base of 6760 is used in said quantizing integer value, According to the fifth aspect, latitude and longitude are quantized by value of 6760^2. That optimizes a format in the third aspect, using two non-numeric characters and one number, 26*26*10=6760 of presentation ability. This maximize precision in pointing geographic location, and minimize quantize error and round error.

In addition, upper digits information of latitude and longitude can be treated as coordinate for wide area of 1.6 minutes in latitude depth by 3.2 minutes in longitude width.
lower digits of latitude and longitude can point out precise location within wide area. Precision is 0.000004 degree in latitude by 0.000008 degree by longitude. This angle is less than one meter in both directions, so precision is sufficient for practical usage.

Furthermore, lowest digits of latitude and longitude are decimal. In case of precision of 10 times of minimum precision, 0.00004 degree in latitude and 0.00008 degree in longitude, lowest digit is not necessary. In case of so, make lowest digit always zero decrease human error because lowest digit is not an objective to cognition or memorize.

According to a sixth aspect of the present invention, the method further comprises the step of: Inserting delimiter letter or letters,
characterized in that,
letters used in delimiter letter or letters are exclusive letters from letters used in said formatted string, and said delimiters is inserted one or more positions where that is between a digit that only numeric character is used and a digit that only non-numeric character is used.

According to the sixth aspect, delimiter strings are inserted into formatted string code. It increases an ability to recognize or readability. For example, credit card number has 16 digits, but delimited into four parts to increase readability. Like credit card number format, if delimiter exists, human recognition is done on each part, so burden for one cognition decrease, then human error decrease.

In a formatted string code in that positions of numeric code and non-numeric code are fixed, where number and non-number next to each other will be recognized as a delimiter or breakpoint. For example, format in the third aspect is "letter, letter, number" is repeated four times. Thus the string delimited into eight parts.

However, too many delimited part decrease human's cognition ability. Human can not recognize more than seven parts at once. Therefore, inserting delimiter for each 3 letters makes emphasize delimiter and obscure parts where number and non-number next to each other. Thus human recognize that code is delimited into four parts, and cognition process is done four times.

In recognition process of each of four part, the part where number and non-number next to each other now become a delimiter, and increase a cognition efficiency. By appropriate placing a part where number and non-number next to each other and delimiter, it can control the number of data, size of data, and order, so it decreases a human error.

According to a seventh aspect of the present invention, the method further comprises the step of: Inserting delimiter letter or letters,
characterized in that,
letters used in delimiter letter or letters are exclusive letters from letters used in said formatted string, and
inserting one or more delimiters in where separate upper digits information for latitude and longitude and lower digits information for latitude and longitude.

According to the seventh aspect, formatted string is divided into four parts, upper digits information of latitude and longitude, lower digits information of latitude and longitude. Inserting a delimiter to divide above four part give each delimited part has a meaning, then it increase a cognitive efficiency. For example, telephone number has area code, local exchange number, and number. Delimiting long numbers into meaningful part increase cognitive efficiency.

A method of decoding geographic coordinates from formatted string, may comprises the steps of:
accepting formatted string;
converting said formatted string to integer value;
decoding latitude and longitude from said integer value; and
outputting one or both of said latitude and longitude;
characterizing in that
said formatted string is consisting essentially of digits in where only numeric character is used, and digits in where only non-numeric character is used; and said two types of digit are arranged in a fixed pattern.

An apparatus to transform from geographic coordinate into formatted string, may comprises;
mean for accepting latitude and longitude value;
mean for converting said values into integer value;
mean for converting said integer value into formatted string; and
mean for outputting said formatted string;
characterizing in that
said formatted string is consisting essentially of digits in where only numeric character is used, and digits in where only non-numeric character is used; and said two types of digit are arranged in a fixed pattern.

An apparatus to decode geographic coordinate from formatted string, may comprises;
a mean to accept formatted string;
a mean to convert said formatted string to integer value;
a mean to decode latitude and longitude from said integer value; and
a mean to output one or both of said latitude and longitude;
characterizing in that
said formatted string is consisting essentially of digits in where only numeric character is used, and digits in where only non-numeric character is used; and
said two types of digit are arranged in a fixed pattern.

A computer program may realize the apparatus.
A storage media may contain the computer program.
A computer data signal in carrier wave may contain the computer program.
An information media that shows geographic coordinates information
characterizing in that
the way of expression of geographic coordinates of single location or area is in formatted string, along with latitude and longitude, or without latitude and longitude,
wherein said formatted string is consisting essentially of digits in where only numeric character is used, and digits in where only non-numeric character is used; and
said two types of digit are arranged in a fixed pattern.

The information media is display device such as computer display, printed media, computer server to send information to remote display, etc.

It is possible to record geographic location information on magazines, news papers, flyer, ad, telephone directory, address book, etc. easily with less data. In addition, incase that human input manually into navigation system from printed information on paper media, input is easy.

A map with scale to show single or band of latitude and longitude and capable to determine a point or area by latitude scale and longitude scale, characterizing in that said scale is consisting essentially of digits in where only numeric character is used, and digits in where only non-numeric character is used; said two types of digit are arranged in a fixed pattern.

A part or whole of formatted code are displayed on map in North-South direction and East-West direction. Therefore, to find a location or area on map from formatted code does not need decoding latitude and longitude, and done directly.

Therefore, human does not have to handle latitude and longitude value directly. It decreases human error in recognizing or pointing a coordinate, and increase usability.

In addition, the formatted code to point same location is always same, no matter of book, page, or map scale. It decreases a mistake to referring a wrong map.

Furthermore, among multiple maps that has different scale or area, formatted code gives information about relations of scale and geospatial positions.

Furthermore, even if map does not have latitude and longitude, they are decodable by reading formatted string code.

The code has two different kinds of digits representation. In one kind of digit, only numeric character is used. In another kind of digit, only non-numeric character is used. A combination of two kinds of digit makes a pattern, and decrease randomness that cause human error.

BRIEF DESCRIPTION OF THE DRAWINGS

FIG. 4-1 is a detailed flowchart of step 'S2' in 'EP';

FIG. 4-2 is a detailed flowchart of step 'S3' in 'EP';

FIG. 4-3 is a detailed flowchart of step 'S2", that is an alternative of step 'S2' in 'EP';

FIG. 4-4 is a detailed flowchart of step 'S3", that is an alternative of step 'S3' in 'EP';

FIG. 5 is a reference chart between value and letter in the transformed code;

FIG. 6 is a quick reference matrix of carry over system in the transformed code;

FIG. 9 is a example of telephone directory that post the transformed code;

FIG. 11 is an example of a map that a latitude line and a longitude line by the transformed code is written.

DETAILED DESCRIPTION OF PREFERRED EMBODIMENTS

Figure 1:
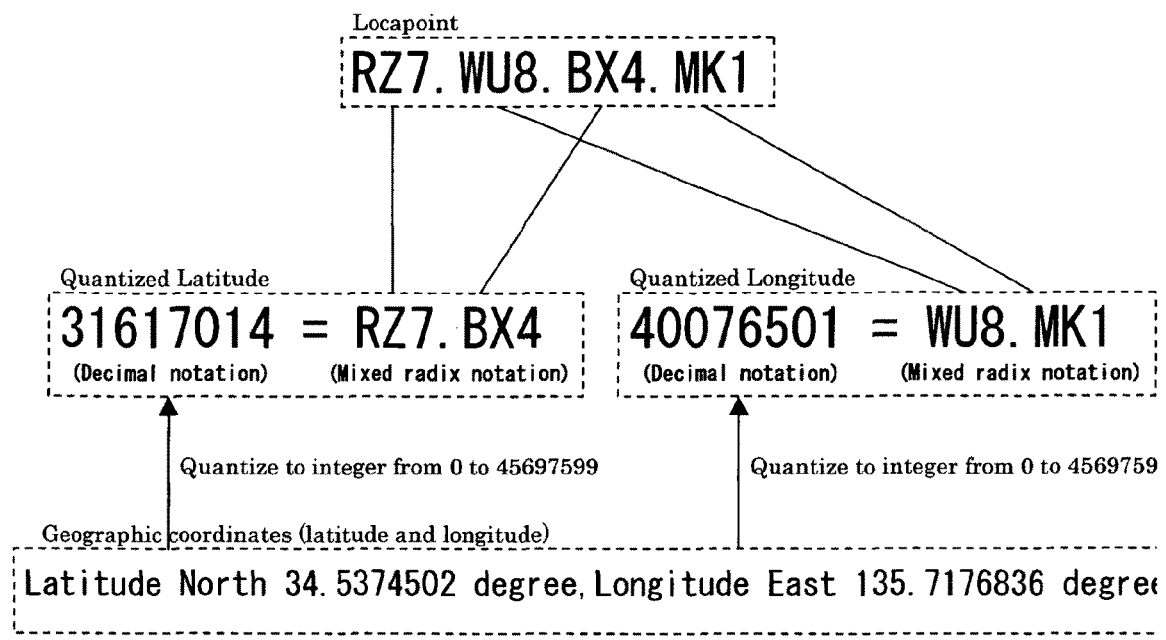
FIG. 1 is an example of transforming between the transformed code and geographic coordinate, more specifically, a latitude value and a longitude value.

As preferred embodiments, use the geographic coordinate transformation with following conditions below, and then describe an example with the code.

Condition One:
For encoding of Latitude value:
Linearly quantize the range from negative 90 degree (South) to positive 90 degree (North) into 45697600 steps, then represents with integer number from integer 0 to 45697599 (=6760^2-1).

Condition Two:
For encoding of Longitude value:
Linearly quantize the range from negative 180 degree (West) to positive 180 degree (East) into 45697600 steps, then represents with integer number from integer 0 to 45697599 (=6760^2-1).

Figure 3:
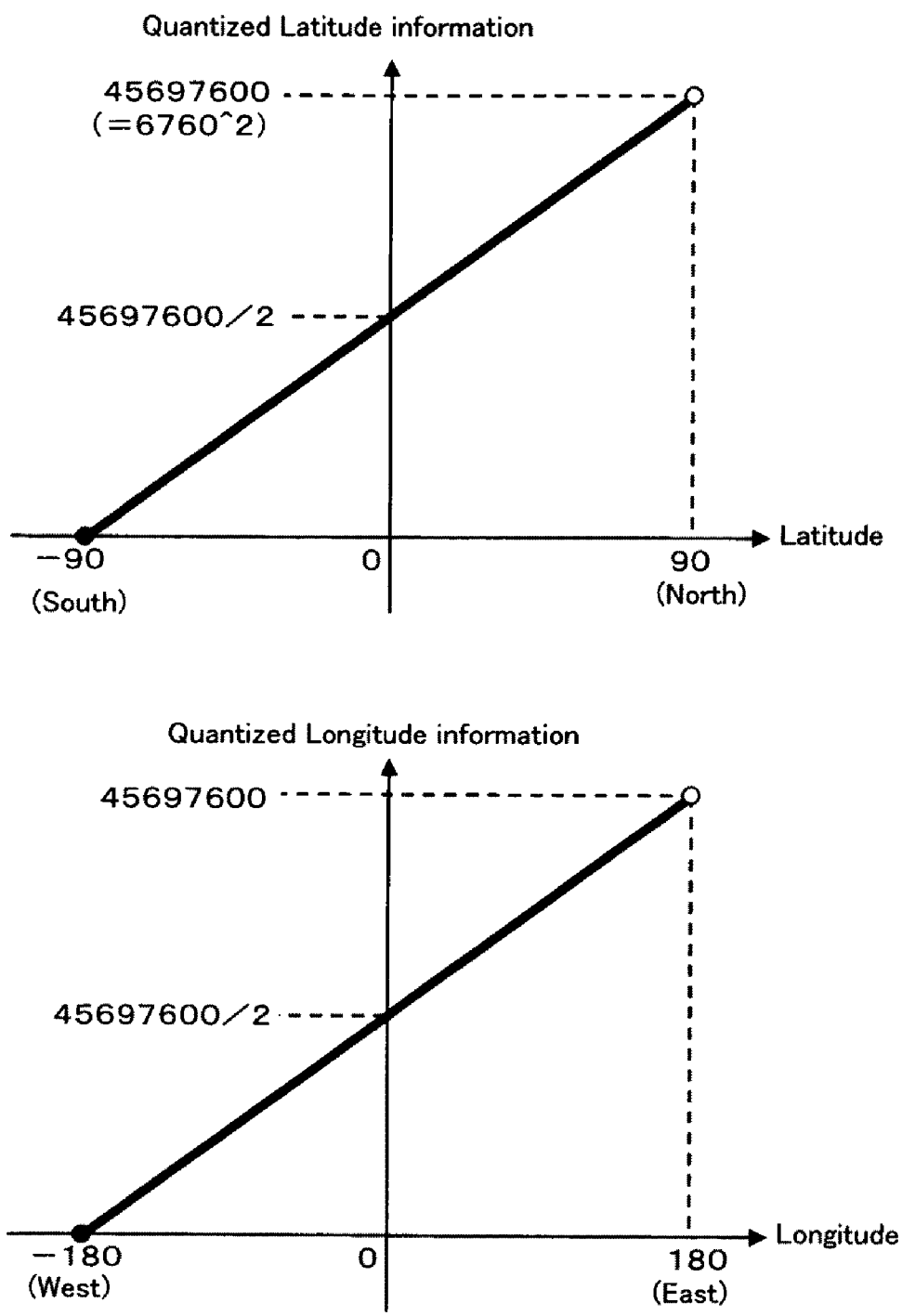
FIG. 3 shows relationship between quantized integer value and a latitude value, or longitude value.

FIG. 3 shows the relation between quantized integer value and latitude or longitude value. Value under decimal point is round off, when quantized.

Condition Three:
For converting integer value into string, use mixed radix notation system, which has digits of base of 10 (decimal notation) and digits of base of 26 ($26^{th}$ notation). In a digit of decimal, value from 0 to 9 is used. In a digit of base of 26, capital alphabets from 'A' to 'Z' in alphabetical order are used to represents values from 0 to 25. The combination of these digits are, from left to right, 'decimal, decimal, and $26^{th}$' and repeat this pattern four times.

Condition Four:
Use period as a delimiter in format.

It should be understood that the embodiments described and illustrated herein are only exemplary and should not be considered as limiting the scope of the present invention. Other variations and modifications may be made in accordance with the spirit and scope of the present invention. For example, quantizing latitude and longitude to integer could be an integer step on 0.00001 degree unit, or 0.1 second unit. Lowest digit can be used as a check digit by giving up a maximum precision. As long as latitude and longitude has certain relation ship to converted integer value, it is sufficient for this invention.

1. The Transformed Code

FIG. 1 show an example of transformed code with conditions defined above hereinafter referred to as 'Locapoint'. Locapoint and latitude or longitude can be converted into integer value and convertible each other.

2. The Format of Locapoint

Figure 2:
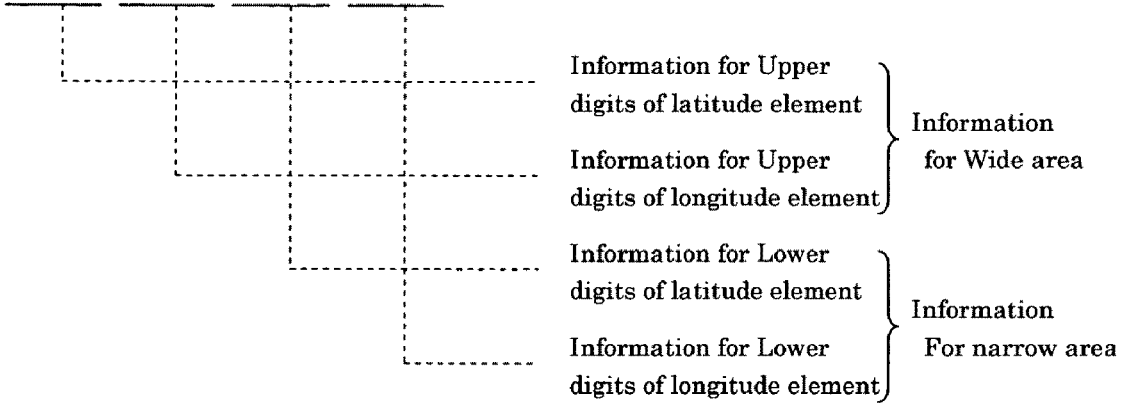
FIG. 2 shows the format of the transformed code.

FIG. 2 shows a format of Locapoint. Using a letter 'A' to represents $26^{th}$ notation digit, 'N' to represents decimal notation, format of Locapoint can be expressed as a fixed length format, 'AAN.AAN.AAN.AAN'. Locapoint is consisted of four parts those are delimited by period. From left to right, each parts represents information of higher digits of latitude, higher digits of longitude, lower digits of latitude, and lower digits of longitude. Higher digits parts can be used as a coordinate of wide area.

Since the pattern of Locapoint is unique, this format can be recognized as a code that shows geographic location, even if it was not mentioned. It is not likely to misrecognize as a telephone number, email address, or any other data format. Since Computer can easily capture the pattern of Locapoint, it is easy to make an automatic connection to map, navigation system or geographic application.

To point a precise geographic location, latitude and longitude is not sufficient. In the strict sense, to define a datum is essential. Various datum are used in many countries.

If define the datum of Locapoint as specific one datum, WGS-84 datum which is used in Global Positioning System in U.S., there is no need to declare which datum is used. Using Locapoint automatically means using WGS-84 datum. In this case, geographic special information can have common datum and common format, then it become easier to share, categorize, or organize location related information around the world or on the Internet.

In prier art, to include location information into WEB pages, special TAG for location must be embedded into a page. If Locapoint is on a plane text, there is no need to embed location information. So simply writing a Locapoint along with address or telephone number, that web page can be detected and used for location based service.

In addition, by comparing two Locapoints shows which one is relatively North, and East intuitively, since larger value of number or later letter means relatively North in latitude, and East in longitude.
Without decoding or calculating, Locapoint can give a special sense of rough direction and distance.

3. Encoding Program

Figure 4:
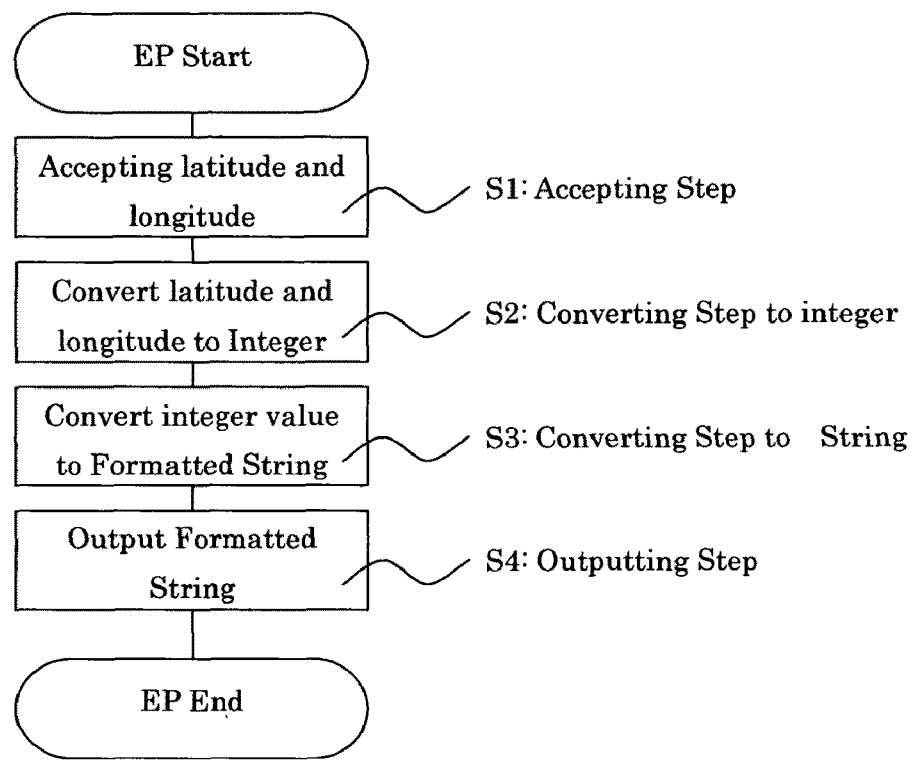
FIG. 4 is a flowchart of encoding program, 'EP'.
Figures 1, 4:
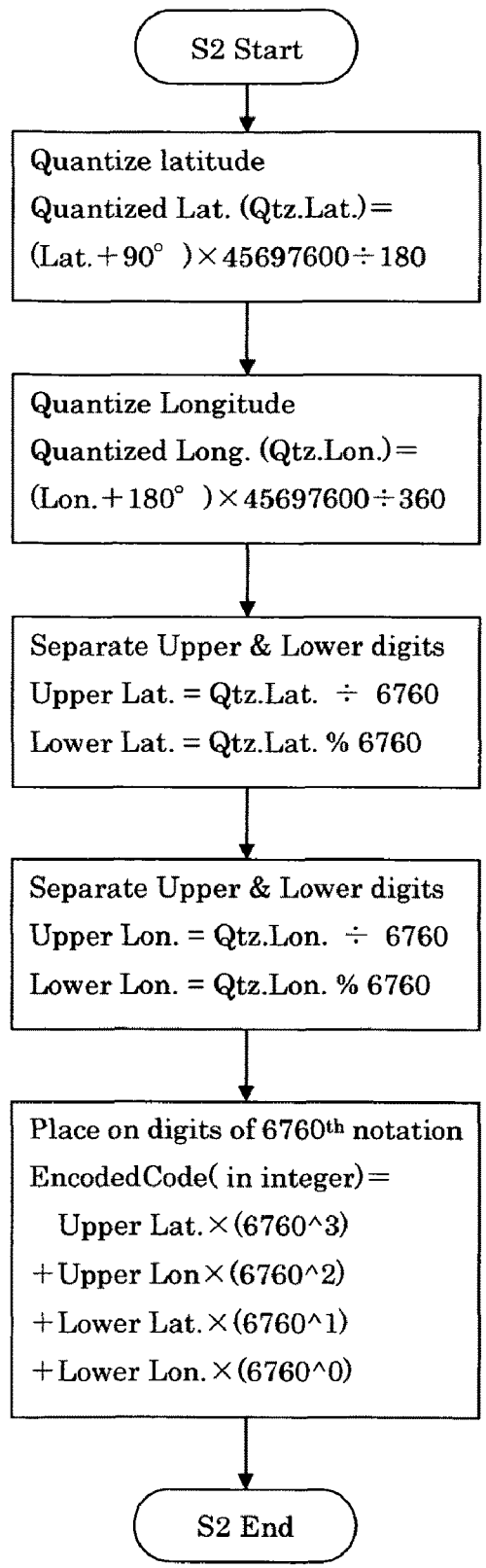
Figures 2, 4:
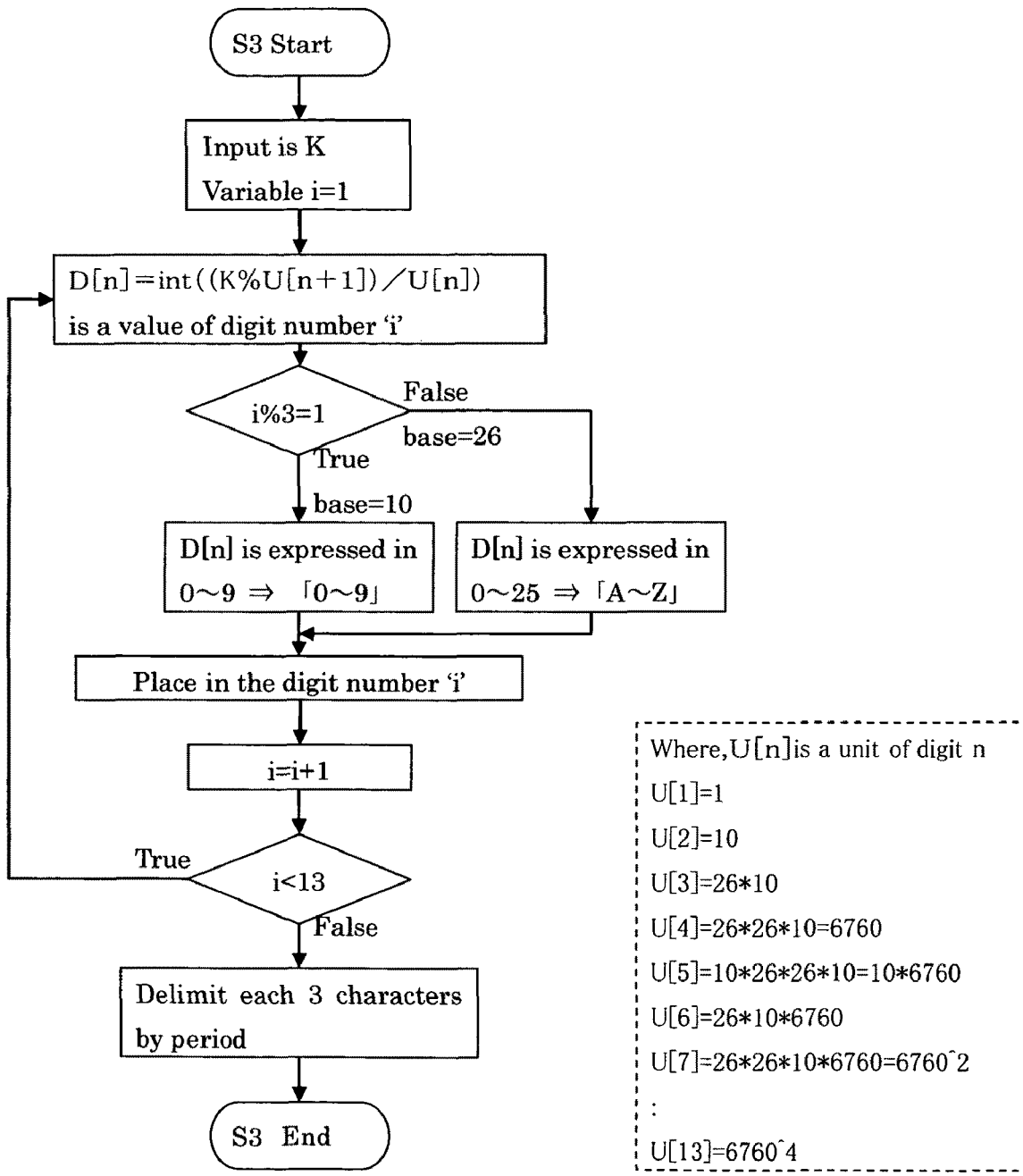
Figures 3, 4:
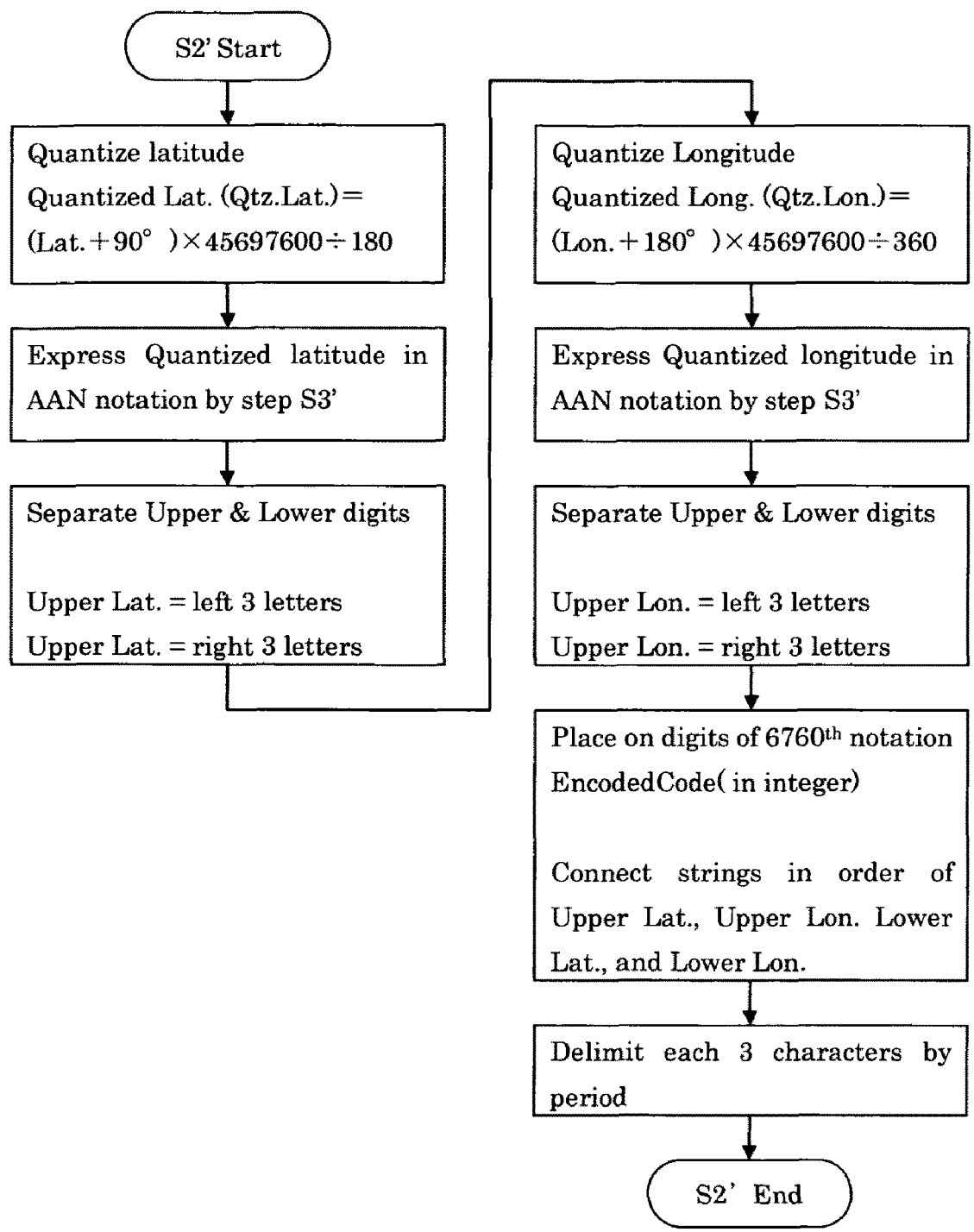
Figure 4:
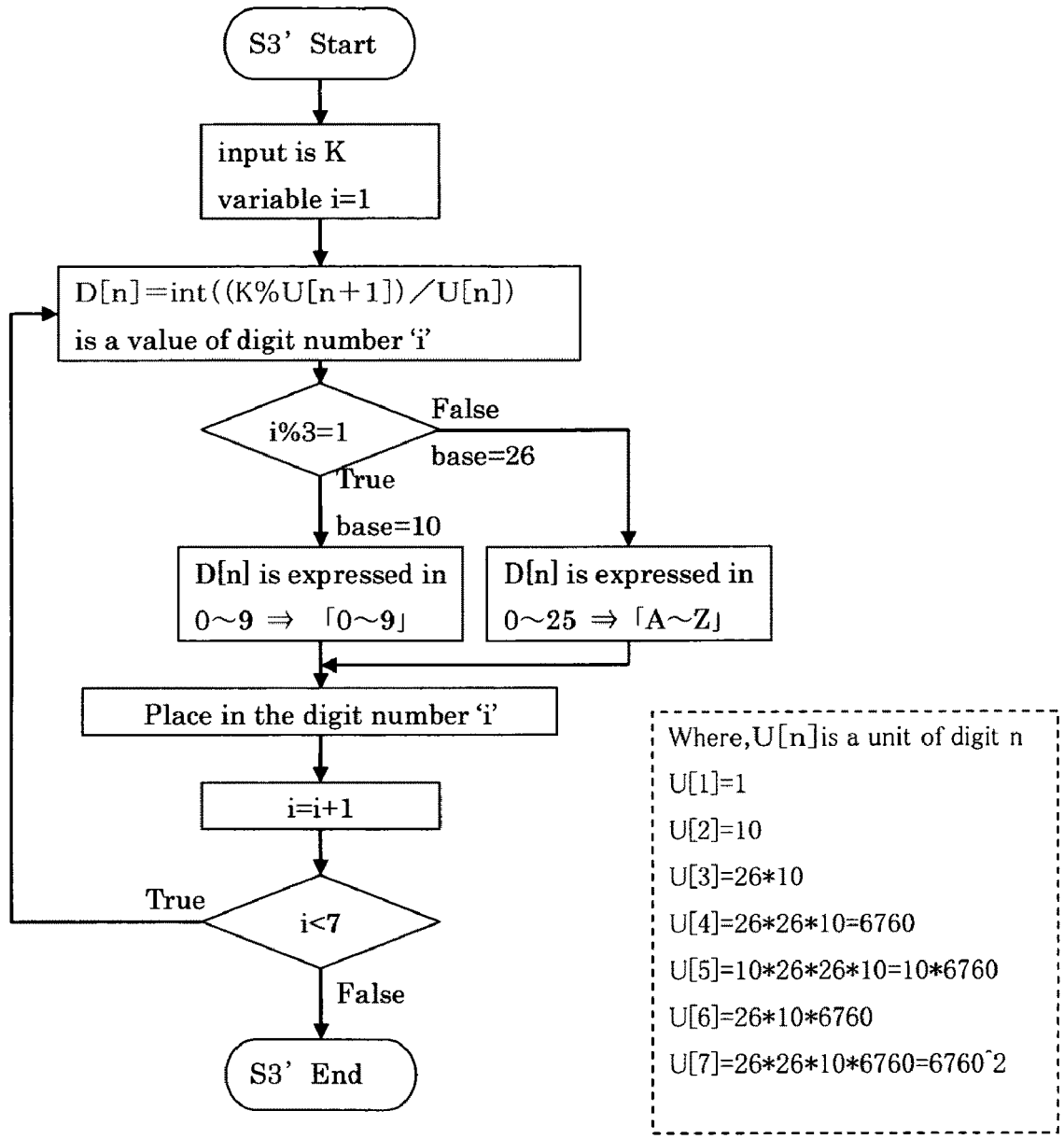

FIG. 4 is a flow chart of encoding program, 'EP', that realize transform of geographic coordinate into Locapoint. Following are explanations of EP.

EP may be stored in digital media, such as floppy disk or CD-ROM. EP may be able to be downloadable from server. EP can be used on or with operating system or other application program.

EP may be stored with operating system, system program (OS), or other program stored in said digital media, and EP may be executed with these programs.

EP may be divided into more than one part, and stored in more than two digital storage media, and then more than one device can be a system that realizes EP.

This program may be executed alone or with another program to encode of geographic coordinate written in one of claims, when installed to information processing device.

Encoding program, EP, comprises 'S1'—step one, as accepting process for geographic coordinate, 'S2'—step two as a quantization process, S3—step three as a converting process into text string, and S4—step four as output process.

For a tangible example, geographic coordinate that is shown in FIG. 1 is used in following. Latitude North 34.5374592 degree and longitude East 135.7176836 degree represents a specific point in Nara prefecture, Japan. This value is used in this example as an input data for DP.

S1 accept latitude and longitude data as an input. Input can be from input devices such as key-board or output of other application programs.

S2 quantize latitude and longitude value into a pair of integer. FIG. 3 is a graph that shows a concept of quantization of latitude and longitude.

FIG. 4-1 shows detailed flow chart of step S2.

The formula of quantization is expressed as following homogeneous transformation program $$Ela = int\{45697600*((La+90)/180)\}$$

$$Elo = int\{45697600*((Lo+180)/360)\}$$

Where
int{ }: A function that round off value into integer
La: Latitude value provided (unit is in decimal degree)
Lo: Longitude value provided (unit is in decimal degree)
Ela: Quantized Latitude information (in integer number)
Elo: Quantized Longitude information (in integer number)
Example data is quantized as following.

$$Ela = int\{45697600*(34.5374502+90)/180\} = int(31617014.35) = 31617014$$

$$Elo = int\{45697600*(135.7176836+180)/360\} = int(40076501.16) = 40076501$$

Quantize continuous value, such as latitude or longitude, generate quantization error. However, quantization error in this case is maximum 0.0000078 degree, and enough precision for practical usage.

In addition, the quantization formula can not handle North 90.0 degree and East 180.0 degree, in a narrow sense. However, East 180.0 degree is the same longitude as West 180.0 degree. Maximum latitude that formula can handle is 89.999996 degree. Therefore, in a practical sense, the formula covers any place on earth.

Each quantized latitude and longitude information are divided into upper digits and lower digits, then placed in different digits in notation of base of 6760. This calculation can be done on decimal notation as following formula.
E: Encoded integer value combines both latitude and longitude information
L: Constant value of 6760

$$E = (Ela/L)*L\wedge 3 + (Elo/L)*L\wedge 2 + (Ela \% L)*L + (Elo \% L)$$

$$= (31617014/6760)*6760\wedge 3 + (40076501/6760)*6760\wedge 2 + (31617014\% 6760)*L + (40076501)$$

$$= 4677*6760\wedge 3 + 5928*6760\wedge 2 + 494*6760 + 3221$$

$$= 1445069983067461$$

A value of '1445069983067461' in decimal notation is expressed as '(4677)(5928)(494)(3221)' in $6760^{th}$ notation. Since it is difficult to prepare 6760 kinds of letter, use '(number)' format is used to express the value of one digit in $6760^{th}$ notation.

Each digit of (4677), (5928), (494), and (3221) corresponds data of higher digits of latitude, higher digits of longitude, lower digits of latitude, and lower digits of longitude.

S3 steps convert integer value into a presentation in unique mixed radix notation. The unique mixed radix notation system has decimal notation digits using from '0' to '9', and has $26^{th}$ notation digits, using from 'A' to 'Z' in alphabetical order for values from 0 to 25. Where N is natural number, (N+1)th digits are decimal notation, (N+0)th digit and (N+2)th digits are $26^{th}$ notation, thus format pattern has a cycle in each three letters. 3 digits can express 26*26*10=6760 kinds of value, 6 digits can express 6760^2 kinds of value, 12 digits can express 6760^4 kind of value.

This unique mixed radix notation system explained above is hereinafter referred to as 'AAN notation' for simpler explanation.

FIG. 5 shows letters and corresponding value that is used in AAN notation depending on the position of digit. For example, a maximum value that can expressed in 3 digit in AAN notation is 'ZZ9', and 'ZZ9' is equivalent to 6759 in decimal. Following formula shows this conversion.

$$'Z'*260+'Z'*10+'9' = 25*260+25*10+9 = 6759$$

FIG. 6 shows some values in AAN notation and corresponding value in decimal notation. FIG. 6 also shows how to carry over in AAN notation.

FIG. 4-2 shows detailed flow chart of step S3.

In S3, integer value generated in S2 is converted in AAN notation. The output of S2 has an information amount of 6760^4, thus twelve digits are needed in AAN notation.

Here is detailed calculations formula for each digit.

$$D[n] = int((K\% U[n+1])/U[n])$$

Where

D[n]: value of digit n in AAN notation. 'n' is from 1 to 12
K: Integer value provided from step S2
U[n]: unit in digit 'n' in AAN notation. U[n] is calculated by following.
U[1]=1
U[2]=10
U[3]=26*10
U[4]=26*26*10,
U[5]=10*26*26*10,
:
U[13]=26*26*10*26*26*10*26*26*10*26*26*10

In this example, S2 provides 1445069983067461 in decimal notation, each digit of AAN notation is calculated as following.

$D[12]=int((1445069983067461\% U[12+1])/U[12])=17="R"$ $D[11]=int((1445069983067461\% U[11+1])/U[11])=25="Z"$ $D[10]=int((1445069983067461\% U[10+1])/U[10])=7="7"$ $D[9]=int((1445069983067461\% U[9+1])/U[9])=22="W"$ $D[8]=int((1445069983067461\% U[8+1])/U[8])=20="U"$ $D[7]=int((1445069983067461\% U[7+1])/U[7])=8="8"$ $D[6]=int((1445069983067461\% U[6+1])/U[6])=1="B"$ $D[5]=int((1445069983067461\% U[5+1])/U[5])=23="X"$ $D[4]=int((1445069983067461\% U[4+1])/U[4])=4="4"$ $D[3]=int((1445069983067461\% U[3+1])/U[3])=12="M"$ $D[2]=int((1445069983067461\% U[2+1])/U[2])=10="K"$ $D[1]=int((1445069983067461\% U[1+1])/U[1])=0="1"$ Using period as delimiter, AAN notation become LocaPoint format, 'RZ7.WU8.BX4.MK1'.

In practical calculations, output from S2 may become large number, at maximum 6760^4. Therefore, depends on computer or programming language, it may over valid range or lose calculation precision.

The calculations done in step S2, can be done also in AAN notation by text string operation. Therefore, convert to AAN notation first, then process its text is more practical.

FIG. 4-3 and FIG. 4-4 show a flowchart of S2' and S3' those are alternative step of S2 and S3.

Figure 7:
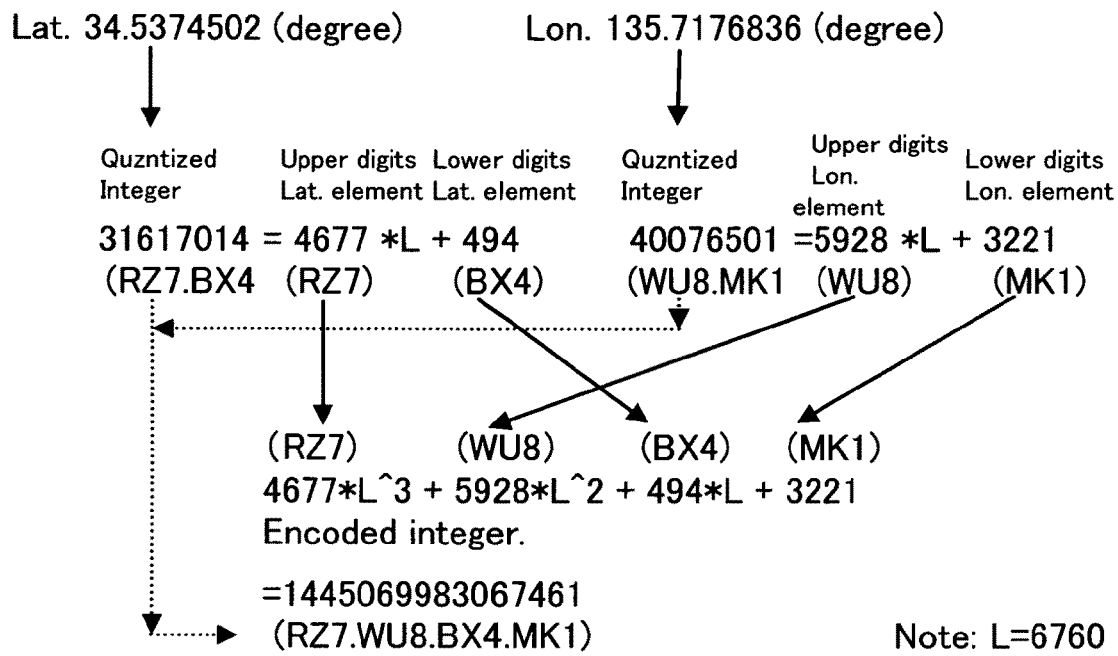
FIG. 7 shows values of each encoding and decoding steps in decimal and in the mixed radix notation system that is used in the transformed code.

FIG. 7 shows intermediate values in each process in AAN notation and decimal notation. Fig shows there are various way to encode Locapoint, rather than S2 and S3, or S2' and S3'.

Following are example of S2' and S3'. In this example, quantized latitude and longitude are converted into AAN notation separately, then reordering a string.

Output value provided by S1 is at maximum 45697650, then 6 digits needed in AAN notation. Calculation of latitude in FIG. 1 is following.

$D[6]=int(31617014\% U[7])/U[6])=17="R"$ $D[5]=int((31617014\% U[6])/U[5])=25="Z"$ $D[4]=int((31617014\% U[5])/U[4])=7="7"$ $D[3]=int((31617014\% U[4])/U[3])=1="B"$ $D[2]=int((31617014\% U[3])/U[2])=2="X"$ $D[1]=int((31617014\% U[2])/U[1])=4="4"$ Therefore, latitude information, '31617014' in decimal becomes 'RZ7BX4' in AAN notation. Similarly, longitude '40076501' becomes 'WU8MK1'.

Since AAN notation has information amount of 6760 for each 3 digits, simply separate text string into half will extract quotient and reminder of 6760.

Therefore,
Upper digits of latitude information is 'RZ7',
Lower digits of latitude information is 'BX4',
Upper digits of longitude is 'WU8', and
Lower digits of longitude are 'MK1'.

Connecting these four string in order of upper digit of latitude, upper digit of longitude, lower digit of latitude, and lower digits of longitude, from left to right, makes the same Locapoint code as step S2 and S3 does.

Step S4 output Locapoint to display, printer, other computer, or other program.

4. Decoding Program 'DP'.

Figure 8:
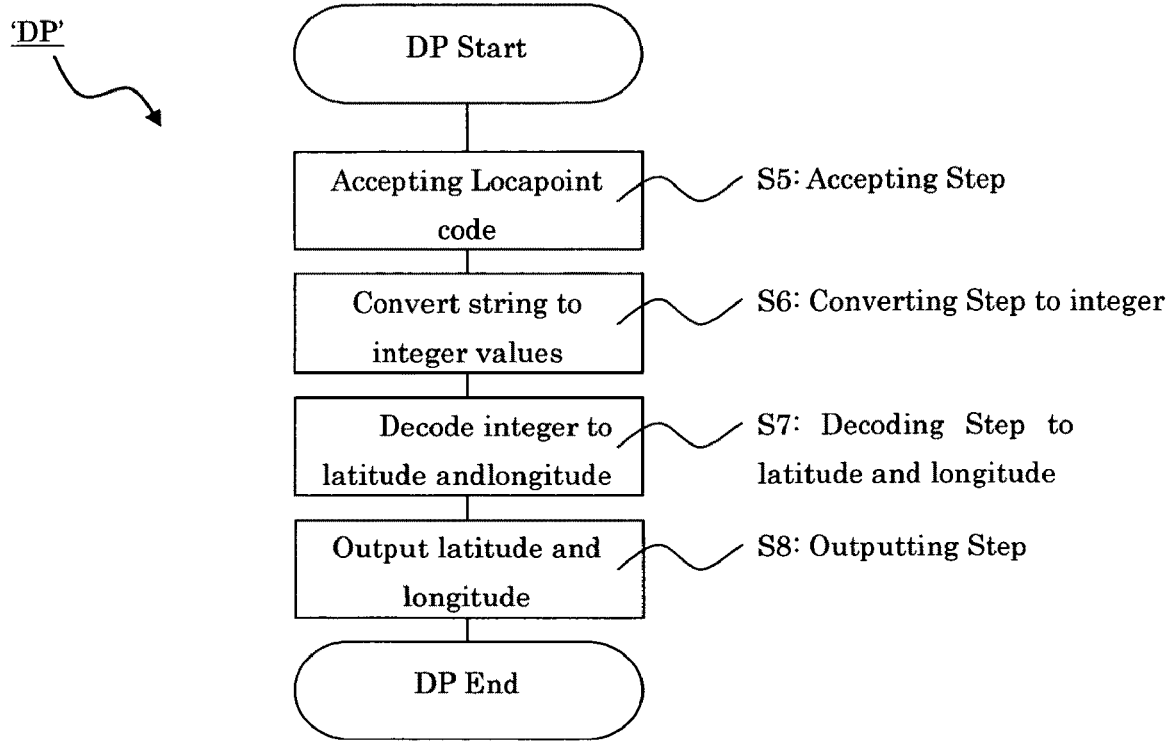
FIG. 8 is a flowchart of decoding program 'DP'.

Following are an explanation of decoding program from Locapoint to geographic coordinate, along with a flowchart in FIG. 8.

For conditions of this example, same conditions for EP are applied.

DP may be stored in digital media, such as floppy disk or CD-ROM. DP may be able to be downloadable from server. DP can be used on or with operating system or other application program.

DP may be stored with operating system, system program (OS), or other program stored in said digital media, and EP may be executed with these programs.

DP may be divided into more than one part, and stored in more than two digital storage media, then more than one device can be a system that realizes DP.

This program may be executed alone or with another program to decode of geographic coordinate written in one of claims, when installed to information processing device.

Decoding program, DP, comprises 'S5'—step five, as accepting process for Locapoint, 'S6'—step six as a converting process into integer in decimal notation, S7—step seven as a converting process into latitude or longitude, and S8—step eight as output process.

For a tangible example, geographic coordinate that is shown in FIG. 1 is used in following. Locapoint 'RZ7.WU8.BX4.MK1' represents a specific point in Nara prefecture, Japan. This value is used in this example as an input data for DP.

S5 accept latitude and longitude data as an input. Input can be from input devices such as key-board or output of other application programs.

S6 considers provided input as a number in AAN notation, then convert into integer in decimal notation. For precision or capacity of computer, it is preferred that separate latitude element and longitude element in AAN notation format first then convert them into decimal integer separately, rather than convert whole AAN notation value into one large decimal integer value first.

Upper digits of latitude='RZ7', Upper digits of longitude='WU8', Lower digits of latitude='BX4' and Lower digits of longitude='MK1', has information amount of 6760 each. Thus, simply connecting to text string can make integer value that has 6760^2.

Therefore,

Latitude information is 'RZ7BX4'

Longitude information is 'WU8MK1'

Following formula shows how to convert AAN notation to decimal notation.

$$D=\Sigma(D[n]*U[n])$$

Where

D: integer value in decimal notation

D[n]: value of digit n in AAN notation. 'n' is from 1 to 12

U[n]: unit in digit 'n' in AAN notation. U[n] is calculated by following.

U[1]=1
U[2]=10
U[3]=26*10=260
U[4]=26*26*10=6760
U[5]=10*26*26*10=67600
U[6]=26*10*26*26*10=1757600

In this example, latitude information and longitude information are calculated as follows. Latitude Information is "R"*1757600+"Z"*67600+"7"*6760+"B"*260+
"X"*10+"4"=17*1757600+25*67600+7*6760+
1*260+23*10+4=31617014

Similarly, longitude information is

"W"*1757600+"U"*67600+"8"*6760+"M"*260+
"K"*10+"1"=40076501

Step S7 process inverse transformation of quantization step.

$$La=180*(Ela/45697600)-90$$

$$Lo=360*(Elo/45697600)-180$$

Where

La: decoded latitude

Lo: decoded longitude

Ela: Integer value for latitude information provided by S7

Elo: Integer value for longitude information provided by S7

In this example,

Latitude is (31617014/6760^2)*180−90=34.537448

Longitude is (40076501/6760^2)*360−180=135.717682

Round at digit of 0.000001, decoded location is Latitude North 34.53745 degree, Longitude East 135.71768 degree. Error in encoding and decode is within quantization error and round precision.

Step S8 output one of, or both latitude and longitude to display, printer, other computer, or other program.

Example 2

A Telephone Directory with Locapoint

FIG. 9 is telephone directory as an example of an information media that shows geographic coordinates information with Locapoint code.

Display device may be computer display to show information on the internet, or printed in paper media. Since Locapoint code can express geographic coordinate with 15 letters, telephone number and geographic location can be displayed together, even in text only media. In addition, it can minimize a display space to show a location.

Figure 10:
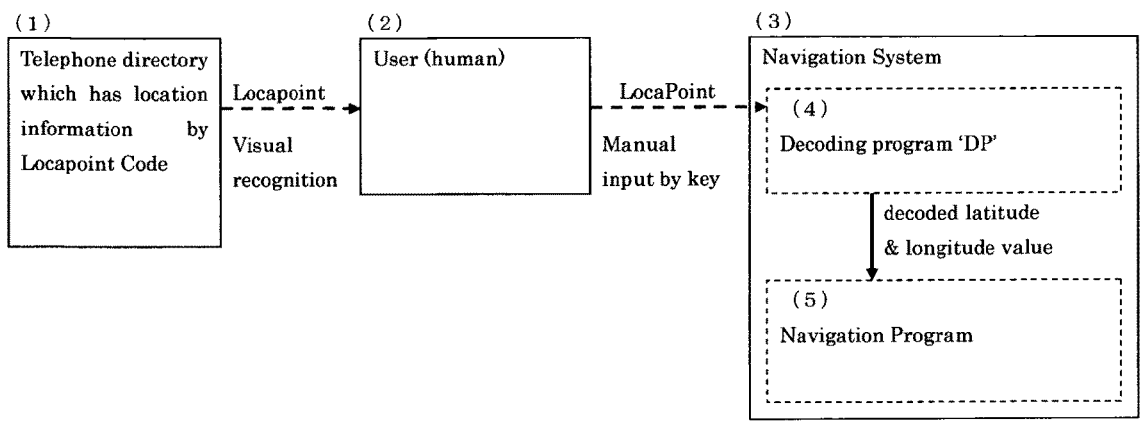
FIG. 10 shows an example of usage of the transformed code on paper media.

FIG. 10 shows a concept of example. In this example, input a Locapoint data that is shown on printed device or information display to navigation system etc, to simplify setting a goal.

(1) is a telephone directory that shows location by Locapoint code (2) is a human as a user (3) is a navigation system that contains encoding program. This could be car navigator, navigation software build in mobile phone, etc.

Assume there is no direct to exchange information between location display (1) and navigation system (3). In this case, user must recognize location information visually, then inputting to a navigation system. This process is via human recognition process. The Formatted string code is designed to decrease a communication error in this process.

Locapoint code inputted to navigation system (3) by user is decoded into latitude and longitude by decoding program (4) built-in a device.

Decoded latitude and longitude value is send to navigation program, then navigation program starts.

Example 3

A Map with Formatted String Code

FIG. 11 is examples of map. The first map shows a coordinate scale by latitude and longitude, and second map shows a coordinate scale by Formatter string code.

A coordinate scale by Formatter string code is encoded from latitude and longitude separately and has one-on-one relationship with original latitude and longitude, so formatted string code can represents latitude line and meridian.

Usually, latitude line and longitude line (meridian) is drawn where value is convenient value to write, for example, M degree N minutes and zero seconds. To use lines by formatted string code, draw a line where code is right value. The second map is an example of lines by code.

As FIG. 11 shows, latitude element "SD2.AA0" and longitude element "WU7.AA0" indicate a point where formatted string code is "SD2.WU7.AA0.AA" by arranging the order of information in order of Upper digit information of latitude, longitude, lower digit information of latitude and longitude.

Like this example, any place on map can corresponds to formatted string code directly, without decoding to latitude and longitude.

Figure 12:
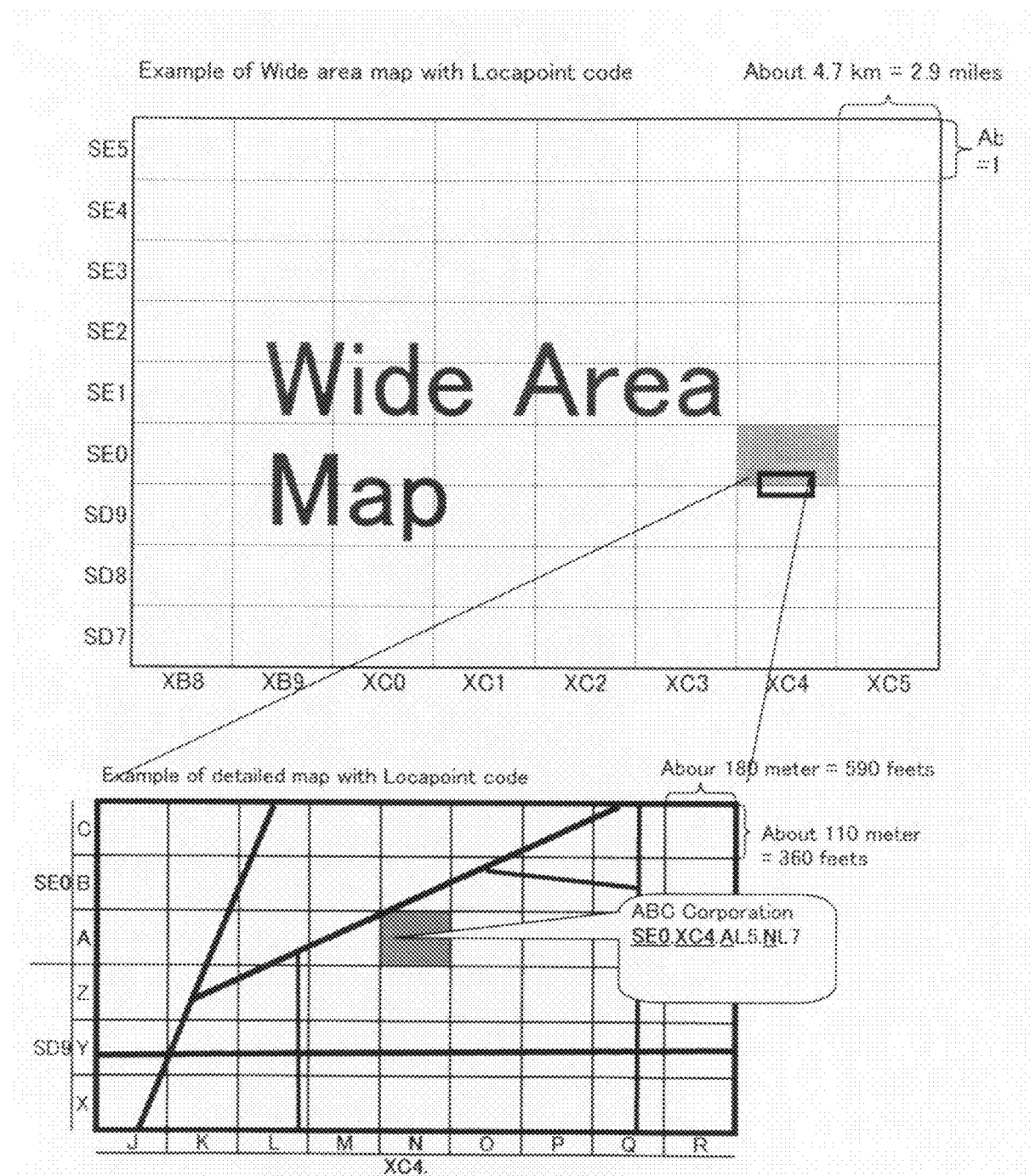
FIG. 12 is an example of a map that a wide area information as a part of the transformed code is written.

FIG. 12 is an example of map that has a part of formatted code on it.

Upper digits information can be considered as information to determine specific width bands. For example, "SE5" can be defined as "greater than or equal to SE5.AA0, and less than SE6.AA0". Similarly, "SE" can be defined as "grater than or equal to SE0.AA0, and less than SF0.AA0".

If using latitude and longitude, it may be said "longitude East 135 degree and 40's" to express a meaning for "greater than or equal to East 135 degree and 40 minutes 0 second, and less than East 135 degree and 50 minutes 0 seconds. Thus, areas where the value of some digit is common are considered as a same area.

However, in example above, to express "40's" as "135° 40'", it is confusing because it indicates "more than 40 minutes" maximum limit is not clear. It may be "less than 41 minutes" or "less than 50 minutes". If it is expressed as "135° 4", 4 may be representing 40's or 04's, and it also confusing.

On the other hand, formatted string code has a format, "letter, letter, number". Thus one letter indicate top one digits, two letter indicate top two digit, one letter and one number indicate bottom two digit, and one number indicates bottom one digit.

Therefore, even it shows a part of digit information of latitude or longitude element, which digit is clear, and the band area the part of code shows can also be defined clearly.

Not only full formatted string code, but also a part of code has a fixed pattern of position of numeric and non-numeric character, so effectiveness to decrease human cognition error is the same.

The first map in FIG. 12 shows a wide area the is indicated by top three letters of each latitude and longitude elements.

Generally, guide maps has a grid, and put a scale of "A, B, C" and "1, 2, 3" for vertical and horizon direction, and indicate objective place like restaurant by rectangle code "B2", "D8", etc., to make easier to find a place. FIG. 12 shows that formatted string code can do the same function.

The map in FIG. 12 has a grid and scale by formatted string code.

By this scale, objective place can be found without decoding a code to latitude and longitude.

Note that actual area that code shows is not precisely a rectangle. It is divided by latitude line and meridian, so higher latitude area is narrow. However, treat this area as rectangle is practical.

The wide area map in FIG. 12 used top three digits of code, showing an area near Tokyo. One rectangle area shows about 3 kilometers in latitude direction by about 5 kilometers in longitude direction. Comparing the code ob objective location to map scale, rough location can be found. Precise area map in FIG. 12 shows top four digit of the code, and indicates a rectangle area about 110 meters in North-South direction by about 180 meter in East-West direction.

For example, assume objective location is "SE0.XC4.AL5.NL7", using upper digits "SE0" and "XC4" on wide area map, can roughly shows a location about 3 km by 5 km area.

Using each top four digits of latitude and longitude element, "SE0.A" and "XC4.N" on precise map, objective location can be found in precision of 110 meter by 180 meter.

Similarly, using top five digit can indicate with precision of 10 meter order, that is enough precision for car navigation usage.

Like this example, precision can be selectable by showing a digit, and the map the formatted code can help to find a location without decoding a code.

In traditional guide map, not only "B2" or "D8" coordinates, but also information of which map, on which page, or which book, is impliedly needed.

On the other hand, grid by formatted code is always same, no matter a number of map, page, scale, book, or even map publisher.

Today, when checking a guide map on station etc. to a map that is carrying, it needs to know the relation of two maps, such as scale or relative position, by comparing shape of the land, shape of roads, or landmarks, etc.

On the other hand, if both map have a formatted string code, it is possible to find an objective location directly on a guide map on station.

In addition, it is difficult to express a relative positions and relative scale among more than two guide maps those has coordinate scale. On the other hand, if using formatted string code in scale, it is possible to read relation between maps in terms of relative position and size.

Furthermore, is it possible to read a formatted string code of specific point on map, then decode to latitude and longitude, even if map does not shows latitude and longitude.

What is claimed is:

1. A method of transforming a geographic coordinate to a geographic location code, comprising the steps of:
   retrieving a latitude value and a longitude value of the geographic coordinate;
   quantizing the latitude value to a first integer value;
   quantizing the longitude value to a second integer value;
   converting the first integer value to a first code string, said first code string including a first digit representing a non-numeric character, a second digit representing a non-numeric character, and a third digit representing a numeric character;
   converting the second integer value to a second code string, said second code string including a fourth digit representing a non-numeric character, a fifth digit representing a non-numeric character, and a sixth digit representing a numeric character;
   and
   combining the first code string and the second code string to obtain the geographic location code having a fixed pattern of radix in a mixed radix notation system representation.

2. The method according to claim 1, wherein, in the step of converting the first integer value to the first code string, said numeric character includes at least one of numeric characters from 0 to M−1 in a notation of radix base of M, and said non-numeric character includes at least one of non-numeric characters from 0 to N−1 in a notation of radix base of N wherein N and M are natural numbers.

3. The method according to claim 1, wherein, in the step of converting the second integer value to the second code string, said numeric character includes at least one of numeric characters from 0 to M−1 in a notation of radix base of M, and said non-numeric character includes at least one of non-numeric characters from 0 to N−1 in a notation of radix base of N wherein N and M are natural numbers.

4. The method according to claim 1, wherein, in the step of converting the first integer value to the first code string, said first code string further includes a seventh digit representing a non-numeric character, an eighth digit representing a non-numeric character, and a ninth digit representing a numeric character.

5. The method according to claim 1, wherein, in the step of converting the second integer value to the second code string, said second code string further includes a tenth digit representing a non-numeric character, an eleventh digit representing a non-numeric character, and a twelfth digit representing a numeric character.

6. The method according to claim 1, wherein, in the step of converting the first integer value to the first code string, said numeric character includes a decimal notation from 0 to 9; and said non-numeric character includes a notation of radix base of 26 from A to Z or from a to z to represents a value from 0 to 25 in alphabetical order.

7. The method according to claim 1, wherein, in the step of converting the second integer value to the second code string, said numeric character includes a decimal notation from 0 to 9; and said non-numeric character includes a notation of radix base of 26 from A to Z or from a to z to represents a value from 0 to 25 in alphabetical order.

8. A storage medium storing a program performing the method according to claim 1.

* * * * *